(12) United States Patent
Bussières

(10) Patent No.: US 8,879,895 B1
(45) Date of Patent: Nov. 4, 2014

(54) SYSTEM AND METHOD FOR PROCESSING ANCILLARY DATA ASSOCIATED WITH A VIDEO STREAM

(75) Inventor: Simon Bussières, Saint-Rémi (CA)

(73) Assignee: Matrox Electronic Systems Ltd., Dorval, Quebec (CA)

( * ) Notice: Subject to any disclaimer, the term of this patent is extended or adjusted under 35 U.S.C. 154(b) by 580 days.

(21) Appl. No.: 12/699,037

(22) Filed: Feb. 2, 2010

Related U.S. Application Data

(60) Provisional application No. 61/164,421, filed on Mar. 28, 2009.

(51) Int. Cl.
*G11B 27/00* (2006.01)
*H04N 5/91* (2006.01)

(52) U.S. Cl.
USPC .................. 386/285; 386/240; 369/4; 700/94

(58) Field of Classification Search
CPC ...... G11B 19/00; G11B 27/00; G11B 27/022; G11B 27/031; G11B 27/3036; G11B 27/30; H04N 5/91; H04N 9/8238
USPC ........... 386/278–290; 369/4; 700/94; 381/22, 381/23, 119
See application file for complete search history.

(56) References Cited

U.S. PATENT DOCUMENTS

| | | | |
|---|---|---|---|
| 5,126,851 A | 6/1992 | Yoshimura et al. | |
| 5,465,240 A * | 11/1995 | Mankovitz | ........................ 369/1 |
| 5,473,631 A | 12/1995 | Moses | |
| 5,568,275 A | 10/1996 | Norton et al. | |
| 5,657,454 A | 8/1997 | Benbassat et al. | |
| 5,701,153 A | 12/1997 | Reichek et al. | |
| 5,764,763 A | 6/1998 | Jensen et al. | |
| 5,844,615 A | 12/1998 | Nuber et al. | |
| 6,035,177 A | 3/2000 | Moses et al. | |
| 6,115,202 A | 9/2000 | Yoshida et al. | |
| 6,400,887 B1 | 6/2002 | Takano et al. | |
| 6,438,317 B1 | 8/2002 | Imahashi et al. | |
| 6,539,163 B1 | 3/2003 | Sheasby et al. | |
| 6,591,057 B2 | 7/2003 | Nagasawa | |
| 6,671,323 B1 | 12/2003 | Tahara et al. | |
| 7,289,717 B1 | 10/2007 | McGrath et al. | |
| 7,295,755 B2 | 11/2007 | Ostermann et al. | |
| 7,359,528 B2 | 4/2008 | Rhoads | |

(Continued)

*Primary Examiner* — Gelek W Topgyal
(74) *Attorney, Agent, or Firm* — Anglehart et al.

(57) ABSTRACT

Method and system for capturing and playing back ancillary data associated with a video stream. At capture, a first video stream and its associated non-audio ancillary data are received. The non-audio ancillary data associated with the first video stream is encoded into a first audio stream on a basis of a predefined encoding scheme. The captured non-audio ancillary data can then be transmitted and processed with the first video stream in the form of the first audio stream. At playback, a second video stream and a second audio stream containing encoded non-audio ancillary data associated with the second video stream are received. The second audio stream is decoded on a basis of a predefined decoding scheme in order to extract therefrom the non-audio ancillary data associated with the second video stream. The second video stream and its associated non-audio ancillary data are then both output for playback. This method of capture and playback enables a non-linear editing application that supports only video and audio data to receive, preserve, display to a user for editing purposes, and transmit unsupported non-audio ancillary data, since the latter is in the form of an audio stream.

30 Claims, 10 Drawing Sheets

(56) References Cited

U.S. PATENT DOCUMENTS

| | | |
|---|---|---|
| 7,369,756 B2 | 5/2008 | Hallberg et al. |
| 7,454,327 B1 | 11/2008 | Neubauer et al. |
| 7,609,938 B2 | 10/2009 | Ando et al. |
| 7,613,380 B2 | 11/2009 | Yanagita |
| 7,643,728 B2 | 1/2010 | Noda et al. |
| 2002/0001450 A1* | 1/2002 | Tabuchi et al. .................. 386/52 |
| 2002/0154890 A1* | 10/2002 | Ito et al. .......................... 386/52 |
| 2003/0086686 A1* | 5/2003 | Matsui et al. .................... 386/52 |
| 2004/0184769 A1* | 9/2004 | Tanaka et al. ................... 386/46 |
| 2006/0050794 A1 | 3/2006 | Tan et al. |
| 2009/0028528 A1 | 1/2009 | Harradine et al. |
| 2009/0240506 A1 | 9/2009 | Wuebbolt et al. |
| 2009/0324201 A1 | 12/2009 | Sakai |
| 2010/0183278 A1* | 7/2010 | Black et al. ..................... 386/52 |

* cited by examiner

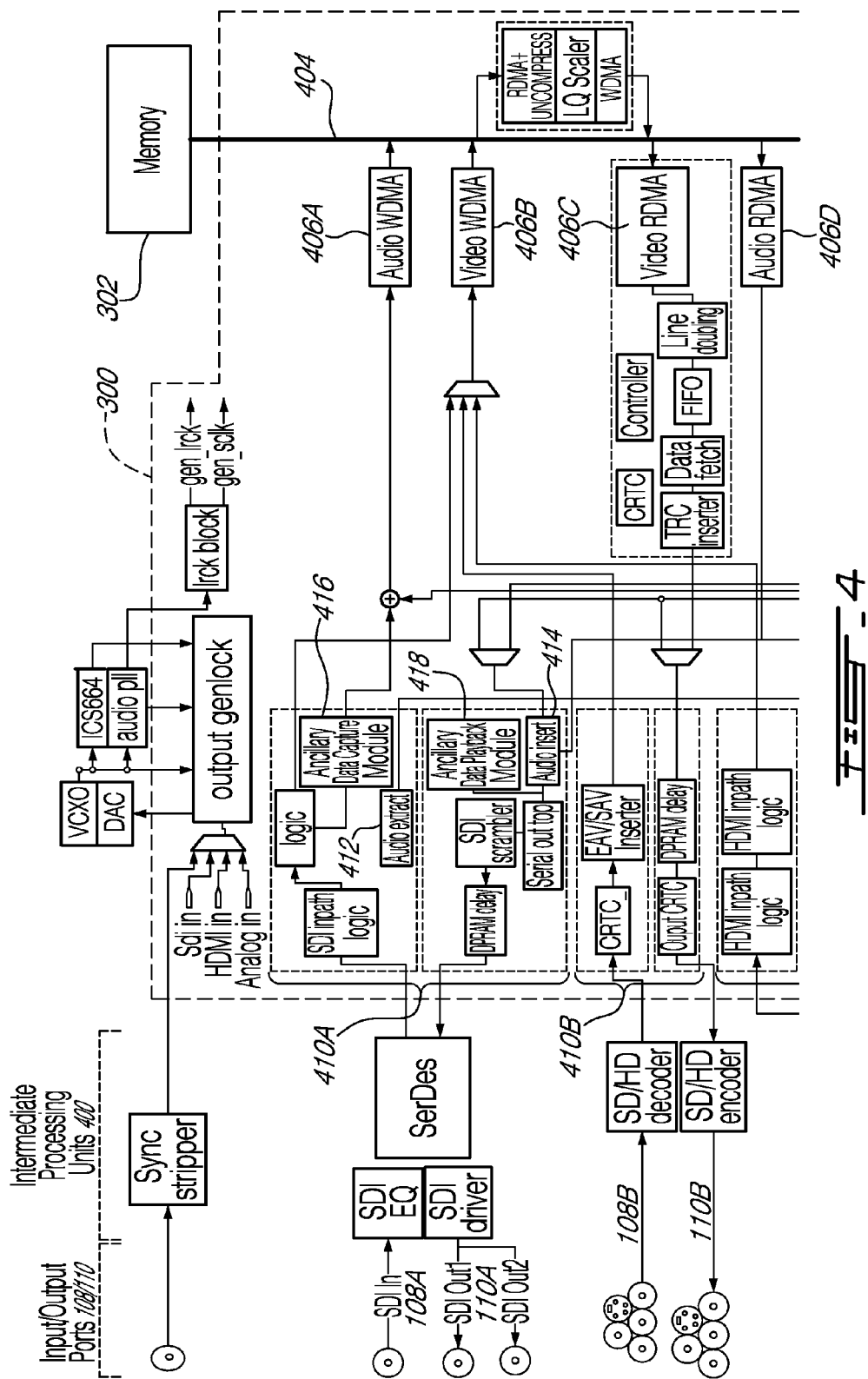

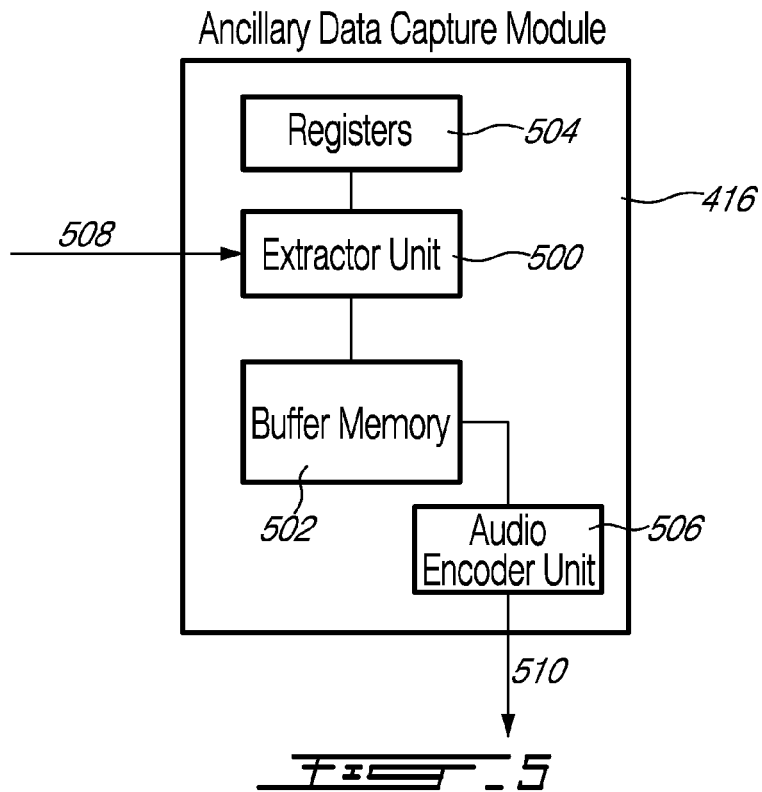
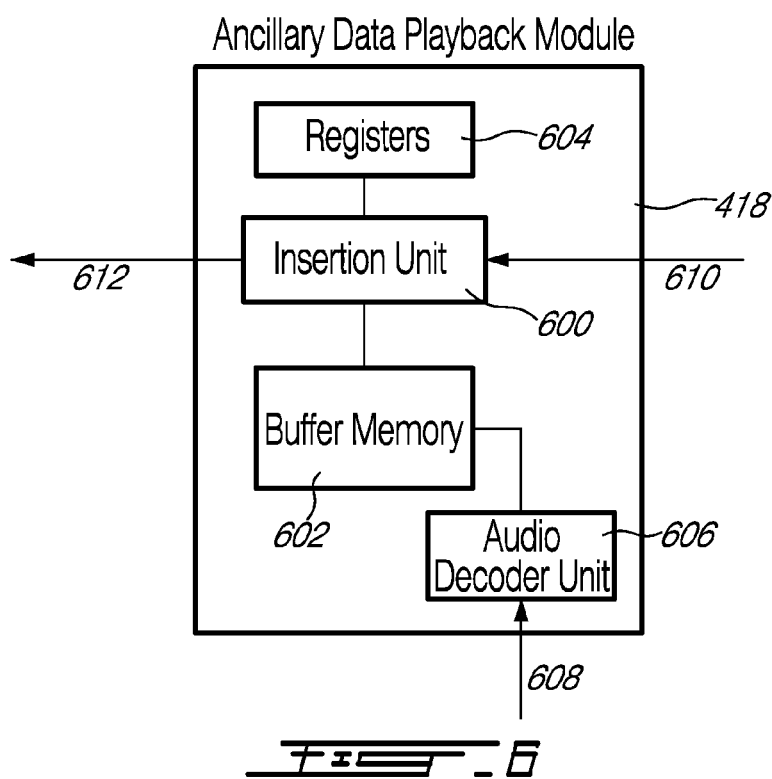

Ancillary data packet formatting into 24 bits linear audio (PCM) in a mono track

| Audio sample number | Audio Data structure | | | | | Legend | |
|---|---|---|---|---|---|---|---|
| | MSBs | | | | LSBs | | |
| | 23 downto 20 | 19 downto 14 | 13 | 12 | 11 downto 4 | 3 downto 0 | |
| 48000 Hz audio | | | | | | | |
| 1 | 0000 | 000000 | 0 | 0 | 00000000 | 0000 | P — even parity of bits data (bits 11 to 4 only) |
| 2 | 0000 | 000000 | 0 | 0 | 00000000 | 0000 | !P — inverse of parity |
| 3 | 0000 | 000000 | 0 | 0 | 00000000 | 0000 | DID — Digital ID |
| 4 | 0000 | 000000 | 0 | 0 | 00000000 | 0000 | SID — Secondary ID |
| ... | | | | | | | DC — Datacount (payload size) |
| | 0000 | 000000 | 0 | 0 | 00000000 | 0000 | payload(x) — Data payload to transmit, |
| | 0000 | 000000 | 0 | 0 | 00000000 | 0000 | Checksum — 9 bits addition of DID, SID, DC and all payload(x) with parity bits |
| Data for first frame  X | 1111 | 100000 | !P | P | DID(7:0) | 1000 | (Checksum(8) — Inverse of bit 8 of above checksum |
| X+1 | 0101 | 101000 | !P | P | SID(7:0) | 1000 | Y — Distance (in number of audio samples) between each packet. Must be dynamically changed depending on the video frame rate |
| X+2 | 0101 | 110000 | !P | P | DC(7:0) | 1000 | |
| X+3 | 0101 | 000000 | !P | P | payload(0)(7:0) | 1000 | |
| X+4 | 0101 | 000000 | !P | P | payload(1)(7:0) | 1000 | ** — Payload size can vary dynamically if needed |
| X+5 | 0101 | 000000 | !P | P | payload(2)(7:0) | 1000 | |
| | 0101 | 000000 | !P | P | payload(3)(7:0) | 1000 | |

FIG. 7

| | | | | |
|---|---|---|---|---|
| 0101 | ... | | | |
| 0101 | 000000 | IP. | P | payload(DC-2)(7:0) | 1000 |
| 0101 | 000000 | IP. | P | payload(DC-1)(7:0) | 1000 |
| 0101 | 000000 | IP. | P | payload(DC)(7:0) | 1000 |
| 0000 | 000000 | checksum(8) | checksum(8) | checksum(7 downto 0) | 0000 |
| 0000 | 000000 | | | 0000000000 | 0000 |
| | ... | | | 0000000000 | |
| | ... | | | ... | |

FIG. 7 CONTINUED

| | | | | | |
|---|---|---|---|---|---|
| Data for second frame | X+Y | 0000 | 0000 | 000000 | 0 | 0000000000 | 0000 |
| | X+Y+1 | 0000 | 000000 | 0 | 0000000000 | 0000 |
| | X+Y+2 | 0000 | 000000 | 0 | 0000000000 | 0000 |
| | 1111 | 100000 | !P | P | DID(7:0) | 1000 |
| | 0101 | 101000 | !P | P | SID(7:0) | 1000 |
| | 0101 | 110000 | !P | P | DC(7:0) | 1000 |
| | X+Y+3 | 0101 | 000000 | !P | P | payload(0)(7:0) | 1000 |
| | X+Y+4 | 0101 | 000000 | !P | P | payload(1)(7:0) | 1000 |
| | X+Y+5 | 0101 | 000000 | !P | P | payload(2)(7:0) | 1000 |
| | 0101 | 000000 | !P | P | payload(3)(7:0) | 1000 |
| | | ... | ... | | | |
| | 0101 | 000000 | !P | P | payload(DC-2)(7:0) | 1000 |
| | 0101 | 000000 | !P | P | payload(DC-1)(7:0) | 1000 |
| | 0101 | 000000 | !P | P | payload(DC)(7:0) | 1000 ** |
| | 0101 | 000000 | !checksum(8) | checksum(8) | checksum(7 downto 0) | 1000 |
| | 0000 | 000000 | | | 0000000000 | 0000 |
| | 0000 | 000000 | | | 0000000000 | 0000 |
| | | ... | ... | | | |

FIG - 7 CONTINUED

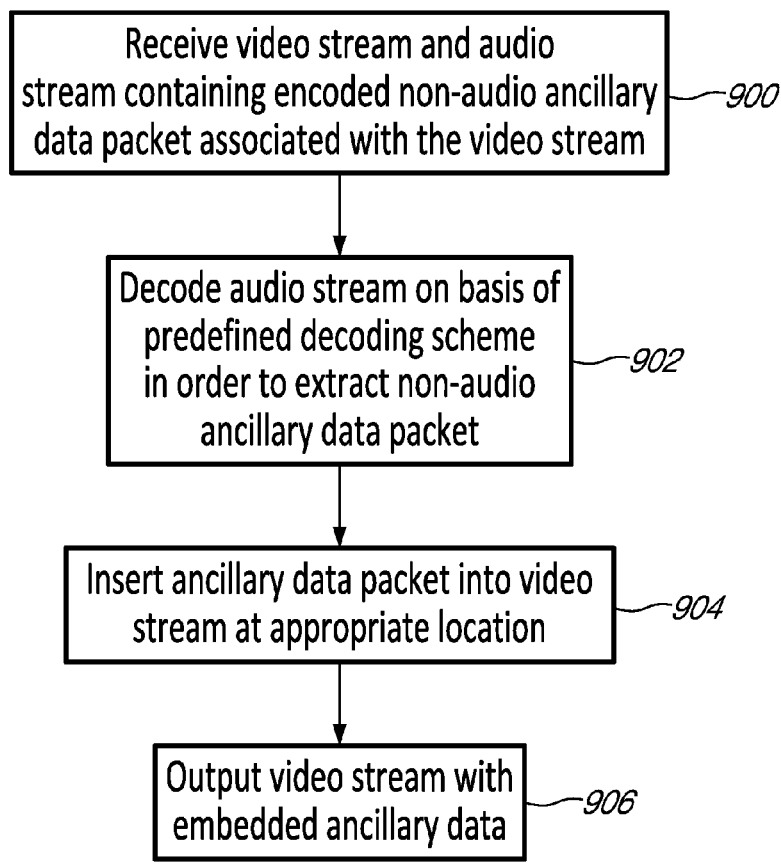

SYSTEM AND METHOD FOR PROCESSING ANCILLARY DATA ASSOCIATED WITH A VIDEO STREAM

TECHNICAL FIELD

The present invention relates generally to the field of video processing and more specifically to a system and method for processing ancillary data associated with a video stream.

BACKGROUND

Non-linear video editing (e.g. for film and television post production) is a well known video editing method that is often referred to as desktop editing, since it is considered to be the audio/video equivalent of word processing. At the heart of non-linear editing is the ability to access any frame in a digital video clip with the same ease as any other.

Generally, in non-linear editing applications, the original video and/or audio source files are not lost or modified during editing. Rather, decisions made by the video editor are recorded by software in an edit decision list. This makes for very flexible editing, since many versions of the original source files can exist without having to store multiple different copies of these files. It also makes it easy to change cuts and undo previous decisions, since this can be done by simply editing the edit decision list. Another advantage is that, with the edit decision lists, the video editor can work on low-resolution copies of the video. This makes it possible to edit both standard-definition broadcast quality and high-definition broadcast quality very quickly, even on normal personal computers (PCs) that would be unable to do the full processing of the huge full-quality high-resolution data in real-time.

Thus, a non-linear editing (NLE) or non-linear video editing (NLVE) system or application is a video and/or audio editing system that can perform random access on its source material and that allows a user to capture, edit, save and playback video and audio streams. In general, a non-linear editing application is a software application running on a computer system, such as a desktop or laptop computer. In some cases, a non-linear editing application receives the active video streams and audio streams through an Input/Output (I/O) system via a communication interface.

Many different NLE software applications exist and can be either purchased directly, included with an appropriate operating system, accessed free as web applications or downloaded free of charge. Examples include Avid Media Composer, Apple®'s Final Cut, Adobe Premiere, Microsoft®'s Windows® Movie Maker, Cinelerra, Blender3D and AVS Video Editor, among other possibilities.

Standard NLE applications support and are adapted to receive and process at least one active video stream and at least one audio stream, to be edited by a user. However, while these standard NLE applications are configured to process video and audio data, they do not support or process data that is both non-video and non-audio. Thus, any non-video, non-audio ancillary data associated with a video stream, such as for example closed-captioning information, payload identifiers, camera position information, time code information and metadata, is not supported by standard NLE applications.

Accordingly, in prior art approaches, the I/O system interfacing with such a standard NLE application is adapted to transfer in an appropriate format to the NLE for each frame of a video stream only the video portion and its associated audio tracks. All other types of ancillary data associated with the video stream, such as closed captioning information and metadata, are lost to the user of the NLE application (i.e. the editor) and can not be restored after editing of the video stream by the editor. Although it may be possible to recreate the lost ancillary data before playing back the edited video stream, this would be time consuming and have to be done through expensive, specialized hardware and software. For example, the editor would have to re-encode closed captioning information into the edited video stream using dedicated hardware and software before playback.

Consequently, there exists a need in the industry to provide an improved method and system for capturing ancillary data associated with a video stream, such that this ancillary data is not only not lost upon editing and/or playback of the video stream by a standard non-linear editing application, but can itself be edited and played back with the video stream.

SUMMARY

In accordance with a broad aspect, the present invention provides a method for capturing ancillary data associated with a video stream. The method includes receiving non-audio ancillary data associated with the video stream and encoding the non-audio ancillary data into at least one audio stream on a basis of a predefined encoding scheme. The method also includes outputting the at least one audio stream.

In a specific, non-limiting example of implementation of the present invention, the non-audio ancillary data is embedded in the video stream and the step of receiving the non-audio ancillary data includes identifying the non-audio ancillary data embedded in the video stream and extracting the non-audio ancillary data from the video stream.

In accordance with another broad aspect, the present invention provides a method for playing back a video stream. The method includes receiving a video stream, as well as an audio stream containing encoded non-audio ancillary data associated with the video stream. The method also includes decoding the audio stream on a basis of a predefined decoding scheme in order to extract therefrom non-audio ancillary data, and outputting the video stream and the extracted non-audio ancillary data.

In a specific, non-limiting example of implementation of the present invention, the step of outputting the video stream and the extracted non-audio ancillary data includes embedding the extracted non-ancillary data in the video stream.

In accordance with yet another broad aspect, the present invention provides an I/O system including a plurality of inputs for receiving video streams, audio streams and non-audio ancillary data, an encoder unit, a decoder unit and a plurality of outputs for transmitting video streams, audio streams and non-audio ancillary data. The encoder unit is connected to at least one of the plurality of inputs and is adapted to encode non-audio ancillary data associated with a first video stream into a first audio stream on a basis of a predefined encoding scheme. The decoder unit is connected to at least one of the plurality of outputs and is adapted to receive a second audio stream and to decode the second audio stream on a basis of a predefined decoding scheme in order to extract therefrom non-audio ancillary data associated with a second video stream.

In accordance with a further broad aspect, the present invention provides a video editing system including an I/O system and a non-linear editing application running on a computer system, the non-linear editing application supporting only video and audio data. The I/O system includes a communication interface for data exchange between the I/O system and the non-linear editing application. The I/O system is operative to capture non-audio ancillary data associated with a first video stream, to encode the non-audio ancillary data into a first audio stream and to provide the first audio stream containing the non-audio ancillary data to the non-linear editing application. The I/O system is also operative to receive a second video stream and a second audio stream, to decode from the second audio stream non-audio ancillary data associated with the second video stream and to output the second video stream and the decoded non-audio ancillary data.

BRIEF DESCRIPTION OF THE DRAWINGS

The invention will be better understood by way of the following detailed description of embodiments of the invention with reference to the appended drawings, in which:

FIG. 5 is a block diagram of the ancillary data capture module of the capture/playback unit, according to a non-limiting example of implementation of the present invention;

FIG. 6 is a block diagram of the ancillary data playback module of the capture/playback unit, according to a non-limiting example of implementation of the present invention;

FIG. 7 is a table illustrating the encoding operation of the audio encoder of the ancillary data capture module, according to a non-limiting example of implementation of the present invention;

FIG. 9 is a flow diagram of a process implemented by the ancillary data playback module of FIG. 6, according to a non-limiting example of implementation of the present invention.

DETAILED DESCRIPTION

Figure 1:
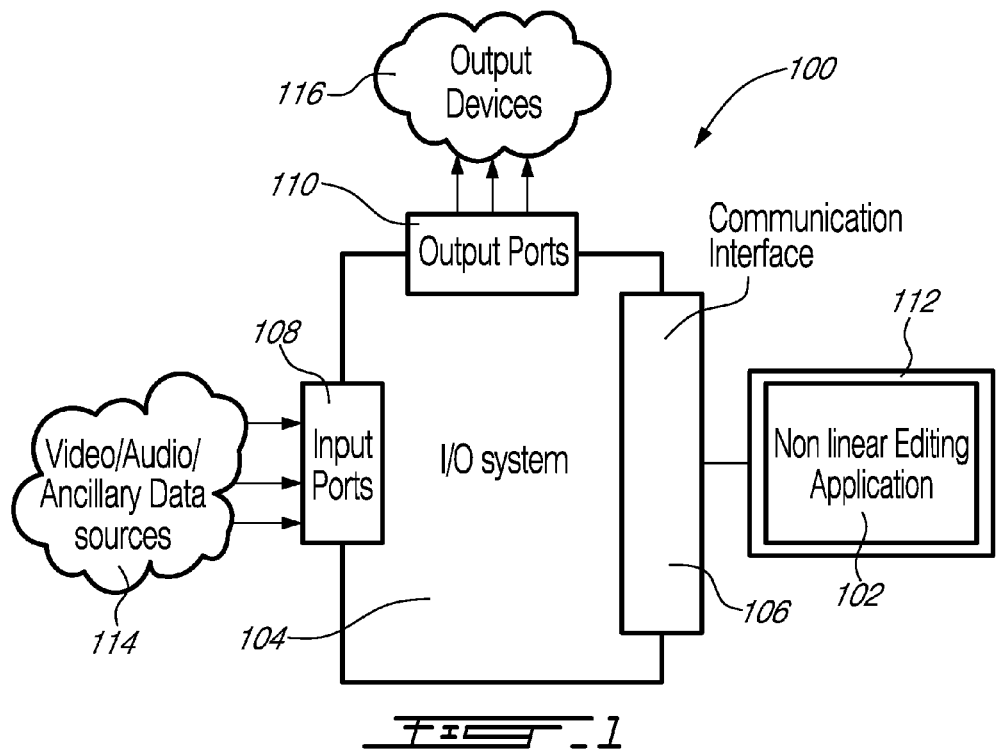
FIG. 1 illustrates a video editing system, according to a non-limiting example of implementation of the present invention.

FIG. 1 illustrates a video editing system 100, according to a non-limiting example of implementation of the present invention. The video editing system 100 includes a standard non-linear editing (NLE) application 102 that exchanges data with an I/O system 104 via a communication interface 106.

In FIG. 1, the standard NLE application 102 is a software application running on a computer system 112, such as a desktop computer, a workstation, a server or a laptop computer, and the I/O system 104 is a remote or stand-alone apparatus that communicates with computer system 112 via communication interface 106. Examples of such a communication interface 106 include a PCI interface, a PCI-X interface, a PCI-e interface, an IEEE 1394 interface and a USB interface, among other possibilities. Alternatively, the I/O system 104 may be a component of the computer system 112 running the NLE application 102, without departing from the scope of the present invention.

The I/O system 104 includes a plurality of input ports 108 for receiving video, audio and/or ancillary data, as well as a plurality of output ports 110 for transmitting video, audio and/or ancillary data. Note that the audio and/or ancillary data may be embedded in incoming or outgoing video streams.

The input ports 108 and output ports 110 may be connected to a plurality of video/audio/ancillary data sources 114 and output devices 116, respectively, via different possible transmission interfaces. It follows that the input ports 108 and the output ports 110 of the I/O system 104 may be of different formats, depending on the corresponding transmission interface. Examples of possible video sources include a remote computer system, a Digital Video Recorder (DVR), a satellite receiver, a BluRay disk player, a video tape player, a DVD disk player and a digital or analog video camera, among other possibilities. Examples of possible output devices include display, storage and/or transmission devices, such as a computer or television display, a Digital Video Recorder (DVR), a DVD Writer, a video tape recorder and a satellite transmitter, among other possibilities. Examples of possible transmission interfaces (and input/output port formats) include Serial Digital Interface (SDI or High-Definition SDI (HD-SDI), High-Definition Multimedia Interface (HDMI), analog composite and analog component, among other possibilities.

As discussed above, a NLE application is a video editing system that allows a user to capture, edit, save and/or playback video and audio streams. In the context of the present invention, a standard NLE application is one that supports and processes video and audio data, but offers no support or limited support of data that is both non-video and non-audio, such as metadata or closed captioning information. Thus, a standard NLE application is capable of receiving and processing either only active video and audio streams or active video and audio streams with limited support of non-video, non-audio data (e.g. a standard NLE application may support one specific type of non-video, non-audio data, such as closed captioning information, but not support any other type of non-video, non-audio data). A user of a standard NLE is able to capture, edit, save and/or playback active video and audio streams, with no or limited possibility of editing and playing back non-video, non-audio data.

In FIG. 1, the standard NLE application 102 receives from the I/O system 104 (via communication interface 106) video streams and audio streams to be edited by a user of the NLE application 102. Since the NLE application 102 only supports video and audio data, a prior art I/O system would be operative to only transmit to the NLE application 102 active video and audio data. Any non-video, non-audio data received at an input port 108 (e.g., embedded in a video stream) would be discarded by the prior art I/O system.

In a specific, non-limiting example, the active video streams received by the standard NLE application 102 from the I/O system 104 are uncompressed video streams, each video stream being formed of a plurality of video frames. Some standard video interfaces used for the transmission of uncompressed video streams define that each video frame contains different types of data, arranged according to a pre-defined spatial layout within the frame. The different types of data contained in a video frame may include active or displayable video data and ancillary data, the latter including embedded audio data, closed captioning or subtitling information, various types of data essence and various types of metadata. Examples of such metadata include Active Format Description (AFD) information, Video Payload Identifier (VPID) information, time code information, Error Detection and Handling (EDH) information, Dolby Audio Metadata and camera position information, among other possibilities.

In another example, each of the video streams or video frames has associated audio data and/or ancillary data, but these are not embedded in the video stream or video frame.

For example, the audio and ancillary data may be received by dedicated input ports of the I/O system 104 distinct from the video input ports.

In the context of the present invention, ancillary data is non-video information (such as audio data, closed captioning information, metadata, etc.) that may be embedded within a video stream or that may be otherwise associated with a video stream. In a specific, non-limiting example, the video stream is a Serial Digital Interface (SDI) stream, such as standardized by the Society of Motion Picture and Television Engineers (SMPTE). In a further non-limiting example, the ancillary data is embedded in the video stream as standardized by SMPTE 291: Ancillary Data Packet and Space Formatting. SMPTE 291 defines that ancillary data packets may be located anywhere within a serial digital video stream, with a few specific exceptions, one of which being that they may not be located in the active video area of a frame. These ancillary data packets are commonly divided into two types depending on where they are located within a frame and specific packet types may be designated to one specific location or another. The SDI video frame is divided into an active video portion, a horizontal blanking portion and a vertical blanking portion. Ancillary packets located in the horizontal blanking portion are generally known as horizontal ancillary data (HANG), while the ancillary packets located in the vertical blanking portion are generally known as vertical ancillary data (VANC). Whereas HANG packets are commonly used for higher-bandwidth data, such as for example embedded audio data, VANC packets are commonly used for low-bandwidth data, such as for example closed caption data and VPID information. Note that, for each different SMPTE packet type (e.g. closed captioning packet, time code packet, payload identifier packet, etc.), the position of the VANC packet within the vertical blanking portion may be different and may change from one SDI video source to another.

*SMPTE*-291 defines a specific packet format for ANC packets. Each ANC packet starts with a data identifier (DID), followed by a secondary data identifier (SDID or SID) and a data count (DC). After the DC is the payload data (also referred to as user data words (UDW)), followed by a checksum (CS). Together, the DID and the SDID indicate the type of ancillary data that the ANC packet corresponds to, while the DC indicates the size of the payload (i.e. how many user data words are to follow). The size of the payload data, that is the number of user data words, is dependent on the particular type of ancillary data. The CS is the last word in an ANC packet and is computed as the sum of all of the other words in the ANC packet.

In the specific example of SDI video streams, the ANC packets are formed of 10-bit words, since SDI is a 10-bit format. Each of the DID, SDID and DC is encoded as a 10-bit word, where bit 8 is a parity bit and bit 9 is an inverse parity bit. The CS is also encoded as a 10-bit word, bits 0-8 storing the sum of bits 0-8 of all of the other words of the packet, bit 9 being the inverse of bit 8. The payload data is a series of 10-bit user data words, each word including a parity bit and an inverse parity bit.

It is important to note that the present invention is not limited to a particular type of video stream or data transmission interface, such that different types and standards of ancillary data (defining different ancillary packet formatting, as well as different layouts and locations of the ancillary data within a video stream) are possible and included in the scope of the present invention.

Figure 2:
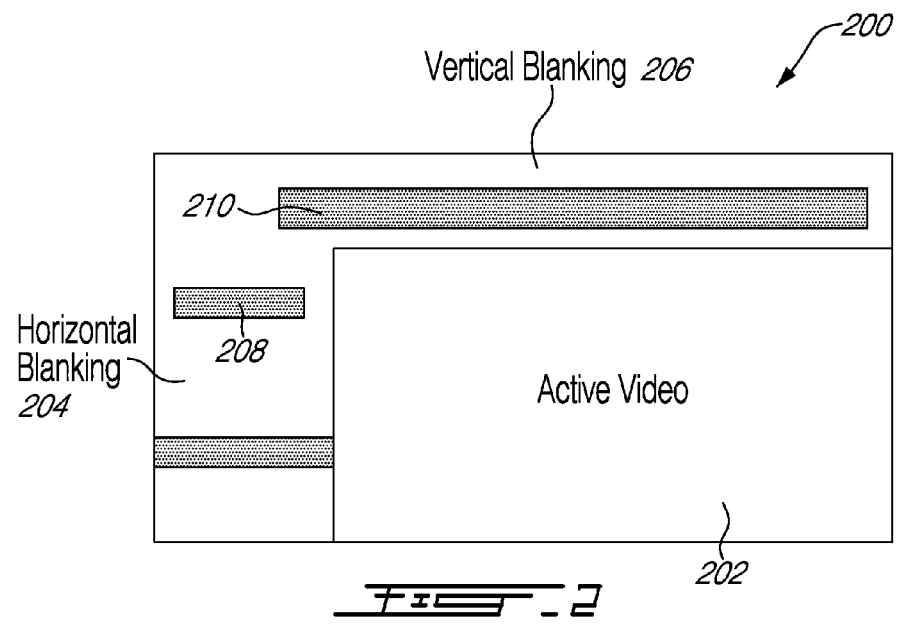
FIG. 2 illustrates an example of the spatial data layout in a frame of a video stream.

FIG. 2 illustrates a particular spatial layout of data in a video frame 200, according to a non-limiting example. In this example, each frame 200 includes an active video portion 202 that contains the displayable video data, a horizontal blanking portion 204 that contains at least one audio track 208 and a vertical blanking portion 206 that contains non-audio ancillary data 210, such as closed captioning information, metadata, etc. Upon receipt of such a frame 200 from a video source, a prior art I/O system would be operative to extract the active video from portion 202, as well as any audio data that may be embedded in portion 204, for transmission to a NLE application. Any non-audio ancillary data present in portions 204 and 206 would be discarded by the prior art I/O system.

Figure 3:
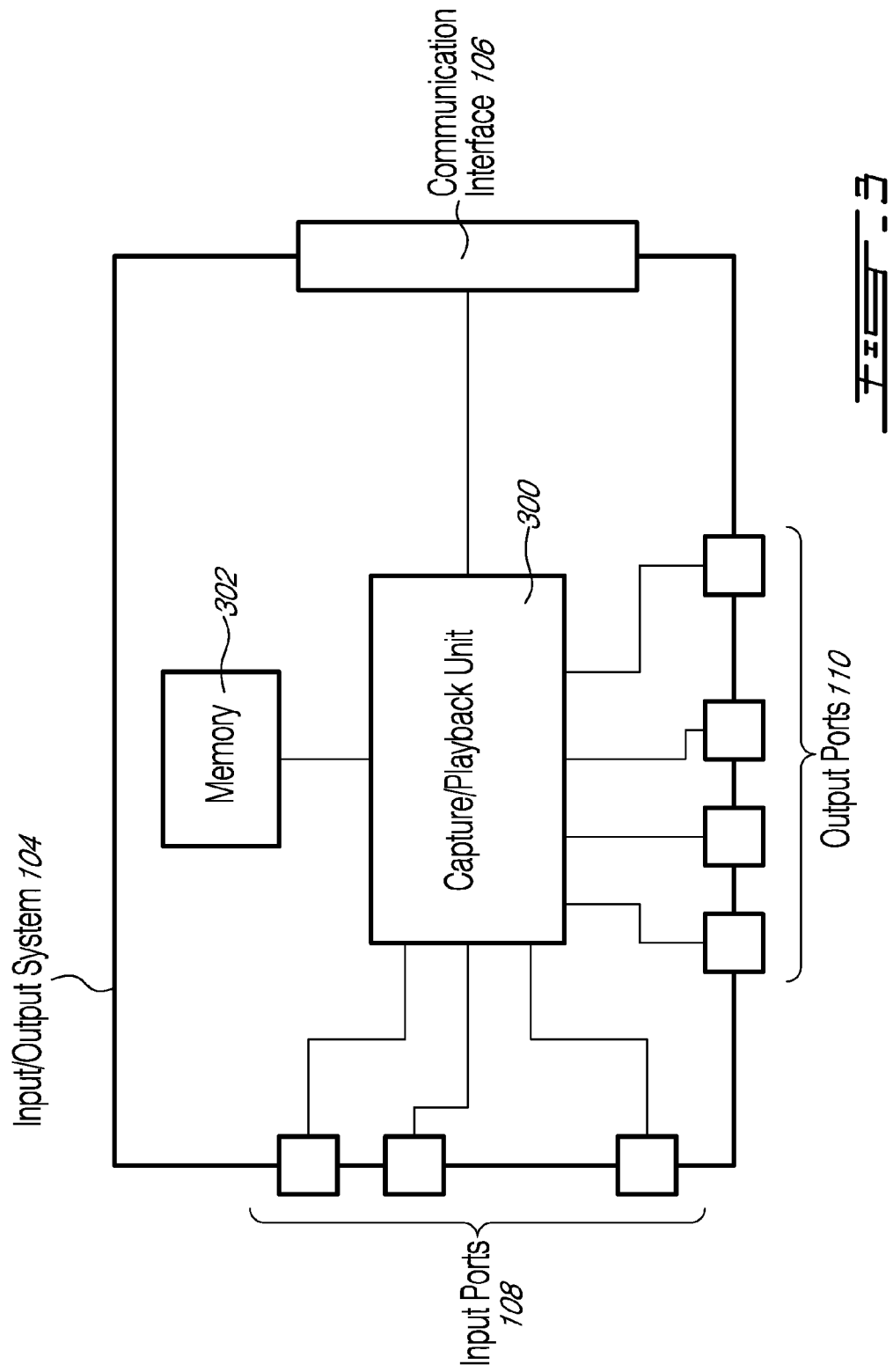
FIG. 3 is a schematic representation of an I/O system for transmitting and receiving video streams, according to a non-limiting example of implementation of the present invention.

FIG. 3 is a block diagram illustrating an exemplary architecture of I/O system 104. As discussed above, the I/O system 104 includes a plurality of input ports 108 and a plurality of output ports 110. The input ports 108 may include input ports for digital video, analog video, digital audio, analog audio, among other possibilities. The input ports 108 may also include input ports for receiving ancillary data, such as closed captioning, metadata, etc. The input ports 108 may include at least one input port for receiving uncompressed video streams, where each uncompressed video stream includes a plurality of frames, each frame including an active video portion storing displayable video data and a non-active portion storing non-video data. In a specific, non-limiting example, at least one of the video input ports 108 is a SDI port for receiving SDI video streams, which may be standard (SD-SDI) or high definition (HD-SDI) video streams.

The output ports 110 of the I/O system 104 may include output ports for digital video, analog video, digital audio, analog audio, among other possibilities. The output ports 110 may also include output ports for outputting ancillary data, such as closed captioning, metadata, etc. The output ports 110 may include at least one output port that is adapted to transmit uncompressed video streams, where each uncompressed video stream includes a plurality of frames, each frame including an active video portion storing displayable video data and a non-active portion storing non-video data. In a specific, non-limiting example, at least one of the video output ports 110 is a SDI port for outputting SDI video streams, which may be standard or high definition video streams.

As shown in FIG. 3, the I/O system 104 also includes a communication interface 106, a capture/playback unit 300 and a memory 302. The capture/playback unit 300 is a processing unit connected to the plurality of input ports 108, for receiving video, audio and ancillary data from the input ports 108, and connected to the plurality of output ports 110, for transmitting video, audio and ancillary data to the output ports 110. Optionally, the capture/playback unit 300 may be connected to the input and output ports 108, 110 via intermediate processing units (not shown in FIG. 3), such as encoders, decoders, serializer/deserializer units, digital-to-analog converters (DACs), analog-to-digital converters (ADCs), etc. Intermediate processing units connected between the input ports 108 and the capture/playback unit 300 may be used to format the input data prior to its processing by the capture/playback unit 300, as well as to set registers of the capture/playback unit 300 with appropriate parameters for performing the processing operations. Intermediate processing units connected between the capture/playback unit 300 and the output ports 110 may be used to format data output by the capture/playback unit 300 in accordance with a specific output format of a particular output port 110.

The capture/playback unit 300 is connected to memory 302, which is operative to store data, including for example active video portions of a video frame, audio data, closed captioning information, metadata or any other ancillary data that may be embedded in or associated with a video stream. During the course of performing its processing operations on the incoming video, audio and ancillary data streams, the capture/playback unit 300 is operative to temporarily store data to, and to retrieve data from, memory 302, where this data may be lines or pixels of one or more video frames, audio samples of an audio track, ancillary data, etc. Memory 302 is shown in FIG. 3 as being local to the I/O system 104. Alternatively, the memory 302 may be remote from the I/O system 104, implemented in a remote computing system (e.g., host memory) or in a standalone storage device and connected to the capture/playback unit 300 via an appropriate communication interface (e.g. bus system). It should be noted that storage and retrieval of data to and from the memory 302 may be done in more than one way, without departing from the scope of the present invention.

The capture/playback unit 300 is further connected to communication interface 106, such as for example a PCI, PCI-X, PCI-e, IEEE 1394 or USB interface. As described above, communication interface 106 is used to transfer data (e.g., instructions, video streams, audio data and ancillary data) between the I/O system 104 and a separate processing system, such as a general-purpose computer system or a video editing system, among other possibilities. In a specific, non-limiting example, the communication interface 106 is used to transfer data between the capture/playback unit 300 of the I/O system 104 and a non-linear editing application. Note that the communication interface 106 may be used to transfer data during a normal operation mode of the I/O system 104, as well as during a configuration mode of the I/O system 104, the latter mode to be discussed in further detail below.

Specific to the present invention, the capture/playback unit 300 of the I/O system 104 is operative to capture and playback non-audio, non-video data (also referred to herein as non-audio ancillary data) associated with a video stream, in such a way that this non-audio ancillary data can be transmitted to and received from a standard NLE application (for example, one that only supports video and audio data) without having to modify the standard NLE application. Simply put, the capture/playback unit 300 encodes the non-audio ancillary data into a standard audio stream on a basis of a predefined encoding scheme. This audio stream can then be exchanged between the I/O system 104 and the standard NLE application, since such audio streams are fully supported by standard NLE applications. Upon receipt of such an audio stream from the standard NLE application, the capture/playback unit 300 decodes the audio stream in order to extract therefrom the non-audio ancillary data, on a basis of a predefined decoding scheme.

Although described herein in the context of a standard NLE application, the present invention is also applicable in other contexts, such as for example a video storage device, a video record/playback device or some other system or device that supports only video data and audio data, with no or limited support of non-audio ancillary data associated with a video stream.

The present invention may also be useful in the case of a NLE application that has limited support (as opposed to no support) for non-audio ancillary data. For example, if a NLE application supports one type of ancillary data (e.g., metadata), but does not support another type of ancillary data (e.g., closed caption information), the unsupported ancillary data type or types can be exchanged with the NLE application by encoding the unsupported ancillary data type(s) into audio streams.

Figure 4:
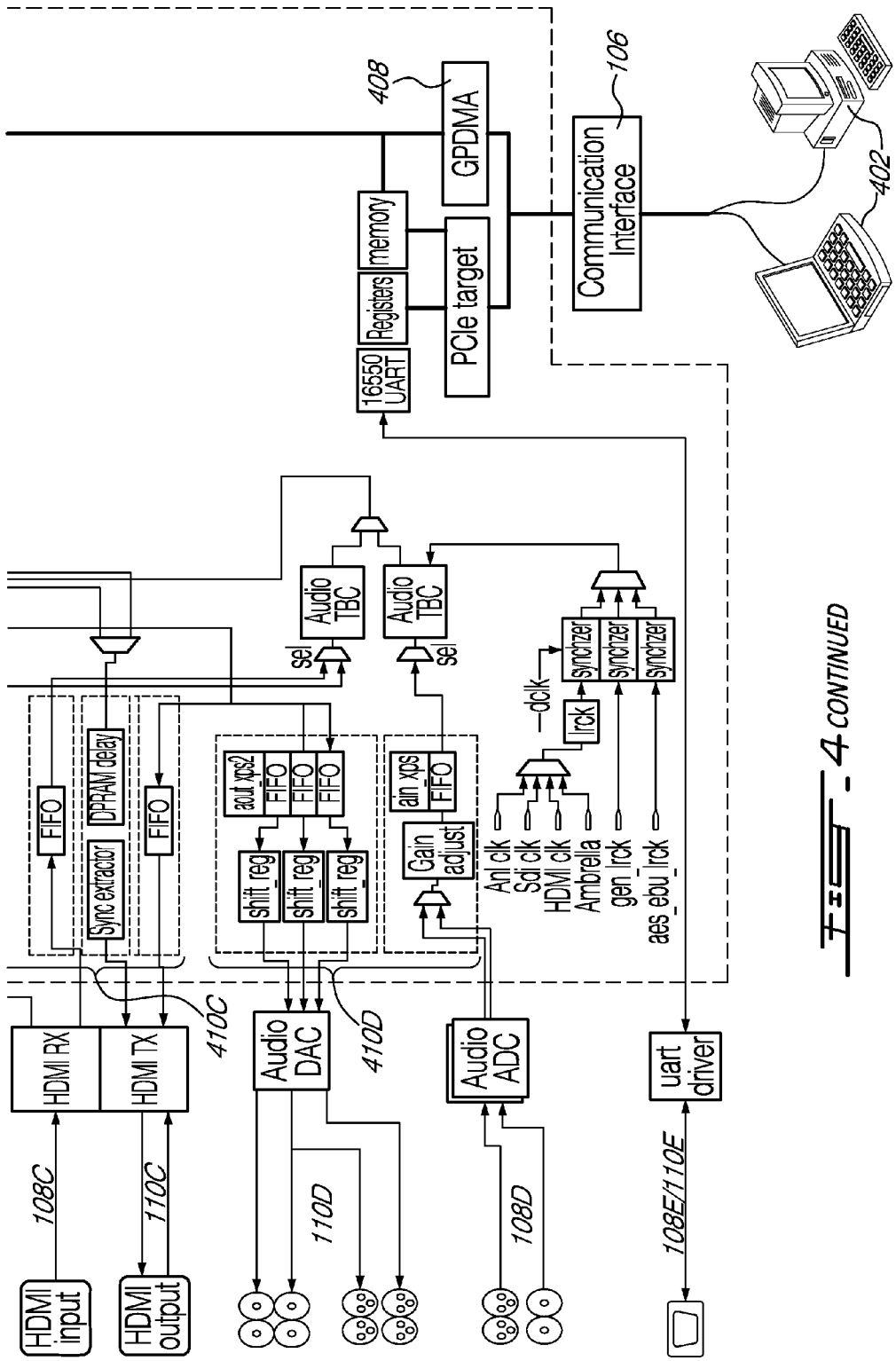
FIG. 4 illustrates the capture/playback unit of the I/O system shown in FIG. 3, according to a non-limiting example of implementation of the present invention.

FIG. 4 illustrates a simplified architecture of the capture/playback unit 300, in accordance with a non-limiting example of implementation of the present invention. The capture/playback unit 300 of I/O system 104 includes a bus 404 connected to memory 302, as well as a plurality of direct memory access (DMA) modules 406. The DMA modules 406 are connected to the bus 404, as well as to the plurality of input ports 108 and output ports 110 of the I/O system 104 (via various intermediate processing units 400).

As is well known, DMA modules allow certain hardware subsystems within a computer system to access memory for reading and/or writing independently of a central processing unit. In the case of capture/playback unit 300, the DMA modules 406 allow the audio and video hardware subsystems 410 of the capture/playback unit 300 to read and write directly to and from memory 302. For each type of input/output port 108/110 (e.g. SDI or HD-SDI port, HDMI port, analog component port, analog composite port, etc.), the capture/playback module 300 includes a respective hardware subsystem 410 for receiving, processing and transmitting the corresponding video and audio streams, where each hardware subsystem is designed in accordance with the corresponding transmission interface standard. Each such audio/video hardware subsystem 410 of the capture/playback unit 300 is connected to the DMA modules 406.

An audio write DMA (audio WDMA) 406A is operative to receive audio data received from at least one input port 108 and store the audio data in the memory 302. A video write DMA (video WDMA) 406B is operative to receive video streams received from at least one input 108 and store this video stream in the memory 302.

A video read DMA (video RDMA) 406C and an audio read DMA (audio RDMA) 406D are operative to read from memory 302 video data and audio data, respectively, and to transmit this data to an appropriate output port 110 of the I/O system 104.

The capture/playback unit 300 also includes a general purpose DMA (GPDMA) 408, operative to transfer data between the memory 302 and the communication interface 106. As discussed above, this communication interface 106 provides for data exchanges between the capture/playback unit 300 of the I/O system 104 and one or more remote processing systems 402. Each such remote processing system 402 may be running an application, such as a standard NLE application, that receives/transmits video and audio streams from/to the capture/playback unit 300. Alternatively, the communication interface 106 may provide for data exchanges between the capture/playback unit 300 and a remote video storage system or video record/playback device, among other possibilities.

Note that the capture/playback unit 300 may include additional components and functionalities, standard or specialized, besides those shown in FIG. 4, without departing from the scope of the present invention.

In the case of a video transmission interface standard (and input/output port format) that supports embedded audio data in the video stream, a respective audio/video hardware subsystem of the capture/playback unit 300 includes an audio extraction module and an audio insertion module. The audio extraction module is connected to a video input port and is adapted to receive video streams with embedded audio data. The audio extraction module is operative to extract this embedded audio data from each video stream frame and to transmit this extracted audio data to the audio WDMA module 406A, for storage in memory 302. The audio insertion module is connected to a video output port and is adapted to receive audio data from the audio RDMA module 406D and to embed this audio data in a corresponding video stream to be transmitted to the video output port. Taking for example the SDI input/output ports 108A/110A of FIG. 4, the associated audio/video hardware subsystem 410A includes an audio extraction module 412 for extracting embedded audio data from incoming SDI video streams and an audio insertion module 414 for embedding audio data in corresponding outgoing SDI video streams. Note that, although not shown in FIG. 4 for the sake of clarity, other audio/video hardware subsystems of the capture playback unit 300 (e.g. subsystem 410C (HDMI)) may also include such audio insertion and extraction modules.

Specific to the present invention, the capture/playback unit 300 includes at least one ancillary data capture module connected to a video input port and adapted to receive video streams with embedded ancillary data. The ancillary data capture module is operative to capture non-audio ancillary data associated with each video stream, including for example closed captioning information. In a specific, non-limiting example, the non-audio ancillary data to be captured is embedded in the video stream, in which case the ancillary data capture module is operative to extract the non-audio ancillary data from each video stream frame. The ancillary data capture module then formats the captured non-audio ancillary data such that it can be sent in the form of an audio stream to the audio WDMA 406A for storage in memory 302, as will be discussed in further detail below. Taking for example the SDI input/output ports 108A/110A of FIG. 4, the associated audio/video hardware subsystem 410A includes an ancillary data capture module 416 for capturing non-audio ancillary data associated with incoming SDI video streams and formatting this non-audio ancillary data. Note that, although not shown in FIG. 4 for the sake of clarity, other audio/video hardware subsystems of the capture/playback unit 300 (e.g. subsystem 410C (HDMI)) may also include such an ancillary data capture module.

Note that the ancillary data capture module may be operative to capture more than one type of non-audio ancillary data simultaneously (e.g. extract more than one type of non-audio ancillary data from the video stream), and to format this extracted data into one or more audio streams.

FIG. 5 is a block diagram of the ancillary data capture module 416 of the audio/video hardware subsystem 410A of the capture/playback unit 300, in accordance with a non-limiting example of implementation of the present invention. The ancillary data capture module 416 includes an extractor unit 500, a buffer memory 502, at least one register 504 and an audio encoder unit 506. Note that although the functionality and implementation of the ancillary data capture module will be described herein in the context of received SDI video streams with embedded non-audio ancillary data, this functionality and implementation is equally applicable in the context of other types of video streams with embedded non-audio ancillary data (e.g. HDMI, etc.), as well as in the context of video streams with associated but non-embedded ancillary data (e.g. non-audio ancillary data received in tandem from a separate or the same source).

As discussed above, the ancillary data embedded in SDI video streams can be in the form of ANC data packets located in the horizontal or vertical blanking regions of a frame. More specifically, it is the vertical blanking interval of a frame that typically stores non-audio ancillary data, such as closed captioning information, AFD data, VPID data, metadata and various types of data essence, among other possibilities. As defined by SMPTE-291, a frame of an SDI video stream may contain a single embedded ancillary data packet, located in the vertical blanking interval of the frame, also referred to as a VANC packet.

The extractor unit 500 is connected to the buffer memory 502 and the at least one register 504. The register 504 stores information used by the extractor 500 to identify the particular data (i.e. the VANC and/or HANG packets) to be extracted from the SDI video stream. In a specific, non-limiting example, the register 504 stores one or more data identifiers (e.g. DID of the VANC and/or HANG packets to be extracted from the SDI frames). The extractor unit 500 is operative to receive an SDI video stream 508 and, for each frame of the video stream, to extract the non-audio ancillary data packet(s) from the frame. The extractor unit 500 stores this extracted non-audio ancillary data in buffer memory 502. Obviously, in the case where the non-audio ancillary data associated with the SDI video stream is not embedded therein, but rather received separately, the extractor unit 500 may be disabled or adapted to pass the received non-audio ancillary data directly to the buffer memory 502, without performing any extraction operations.

The audio encoder unit 506 is also connected to the buffer memory 502. Once a complete non-audio ancillary data packet (e.g. a VANC packet) has been stored in the buffer memory 502, the audio encoder unit 506 is operative to format the data stored in the buffer memory 502 on a basis of a predefined encoding scheme, as will be discussed in more detail below. The audio encoder unit 506 transmits the encoded data 510 to the audio WDMA 406A for storage in memory 302 of the I/O system 104.

Note that the ancillary data capture module 416 may include a plurality of registers, used to store various different configuration and/or status parameters for use by the extractor unit 500 in the course of its extraction operations. Optionally, the at least one register 504 (or a separate set of registers) may be connected to the audio encoder unit 506 and may store one or more configuration parameters used by the audio encoder unit 506 during its encoding operations (e.g., an identifier indicating into which audio track of a NLE application to provide the audio stream). The configuration parameter values stored in register 504 (and other registers of the capture/playback unit 300) may be hardcoded or programmed during a configuration step of the I/O system 104, as will be discussed in more detail below.

In operation, as the extractor unit 500 receives the SDI video stream 508 frames, the extractor unit 500 looks for a certain word (or bit) sequence that indicates the presence of a non-audio ancillary data packet (e.g. VANC or HANG packet). In a specific example, the extractor unit 500 looks for a DID value that corresponds to the DID value stored in register 504. Upon recognizing a matching DID in a frame of the video stream, the extractor unit 500 proceeds to extract from the frame all of the ANC packet data and to store this extracted data in the buffer memory 502. The audio encoder unit 506 then proceeds to encode the data from the buffer memory 502 into an audio stream on the basis of a predefined encoding scheme, for example when the extractor unit 500 reaches the active video portion of the frame.

Note that the use of buffer memory 502 within the ancillary data extraction module 416 for temporarily storing the extracted non-audio ancillary data allows for different operating speeds between the extractor unit 500 and the audio encoder unit 506. In a non-limiting example, the frame rate of the video signal received by the extractor unit 500 is 74.25 MHz, while the operating speed of the audio encoder unit 506 is a much slower 48 KHz.

The audio encoder unit 506 is operative to encode the extracted non-audio ancillary packet data into an audio stream 510, to be stored in memory 302 of the I/O system 104. The encoding scheme applied by the audio encoder unit 506 is dependent on the type of transmission interface of the received video streams, which defines the formatting of the ancillary data associated with a video stream, as well as on the particular audio data format of the audio streams (e.g. 24-bit linear PCM, 16-bit linear PCM) to be generated by the audio encoder unit 506. It follows that, for each video/audio hardware subsystem 410 within the capture/playback unit 300 that handles video streams with embedded or associated ancillary data (e.g. SDI or HD-SDI, HDMI, etc.), the audio encoder unit of the respective ancillary data capture module may implement a different encoding scheme.

In a specific, non-limiting example of implementation of the present invention, the audio encoder unit 506 is operative to generate standard digital audio streams in a 24-bit per sample linear (PCM) audio format, where the encoding scheme applied by the audio encoder unit 506 is based on the SMPTE-291 standards defining the packet format of an SDI ancillary data packet. FIG. 7 illustrates a non-limiting example of the formatting applied by audio encoder unit 506 in order to encode the data of SDI non-audio ancillary packets into a single 24-bit per sample linear audio track, where the ancillary data packets of the video stream may contain closed captioning information (SMPTE 334-1), ancillary time code information (SMPTE RP188), payload identification information (SMPTE 352), program description information (SMPTE RP-207) or camera position information (SMPTE 315), among many other possibilities.

In FIG. 7, each line of the table represents the bits of one audio sample in the PCM audio track generated by the audio encoder unit 506. As shown, for a first non-audio ancillary data packet associated with an SDI video stream, the words of the respective ancillary data packet are arranged by the audio encoder unit 506 in a first predetermined group of lines of the audio track. For a second non-audio ancillary data packet associated with the SDI video stream, the words of the respective ancillary data packet are arranged in a second predetermined group of lines of the audio track, and so on for each non-audio ancillary data packet. Each separate 10-bit word of the SDI ancillary data packet (i.e. each one of the DID word, the SID word, the DC word, the payload words and the CS word) is encoded into a separate audio sample of the audio track, by inserting the bits of each word into a separate line of the audio track.

In the specific, non-limiting example shown in FIG. 7, the audio encoder unit 506 inserts the ten bits (bits 9 to 0) of each word of the extracted ancillary data packet into bits 13 to 4 of the corresponding line (or audio sample) of the audio track. For each of these lines of the audio track, the audio encoder unit 506 also sets bits 23 to 14 to predetermined bit values, for the purposes of identifying the beginning of each ancillary data packet in the audio track and ensuring that the resulting audio track is characterized by a special audio waveform (e.g. a square waveform). Advantageously, taking the example where the generated audio track is destined for transmission to a standard NLE application, where it will be displayed to an editor along with the corresponding active video and audio data of the respective SDI video stream, this special audio waveform will facilitate easy recognition by the editor of the non-audio ancillary data of the SDI video stream.

Optionally, bits 3 to 0 of each audio sample containing a word of the extracted ancillary data packet are set to "1000" (the value 8). This is done to ensure that if the audio samples of the audio track are slightly modified during later processing, any such modifications do not affect the value of the ancillary data packet words contained in these audio samples. In the specific example of the processing that audio tracks undergo in a standard NLE application, it is possible that slight audio gain adjustments or re-sampling are applied to the audio samples by the NLE application in order to maintain audio/video synchronization, thus modifying the values of the audio samples in the least significant bit positions. By positioning the ancillary data packet words in higher bits of the audio samples and by setting the least significant bits of these audio samples to an intermediate value such as 8, these audio samples can support slight value modifications (e.g. in the range of −7/+7) while preserving the correct values of the ancillary data packet words contained therein.

It is important to note that various different audio sample layouts and bit patterns can be applied by the audio encoder unit 506 upon encoding of the ancillary data packet words into the audio track, without departing from the scope of the present invention. For example, the ancillary data packet words may be inserted at different bit positions, other than bits 13 to 4, in the respective audio samples. In another example, different bit patterns may be applied to the extra bits of each audio sample, that is, to the bits that do not contain the ancillary data packet word (e.g. bits 23 to 14 and 3 to 0 in FIG. 7), in order to create different audio waveforms. These different audio waveforms may provide additional and/or different information as to the content of the audio file, in the case where the audio file is intended for display to a user (e.g. an editor using a standard NLE application).

Taking for example the case where the non-audio ancillary data associated with the SDI video stream and to be encoded into an audio track is closed captioning information, SMPTE 334-1 defines that the maximum payload size (i.e. number of user data words) of an ancillary data packet containing closed captioning information is 256. It therefore takes a maximum of 260 audio samples to encode a closed captioning ancillary data packet (256 user data words+1 DID word+1 SDID word+1 DC word+1 CS word) into an audio track. Although the specific number of audio samples per frame of an SDI video stream depends on the frame rate, there are at least 800 audio samples per SDI frame. Since there is only one closed captioning ancillary data packet per SDI frame, it follows that a complete ancillary data packet will be captured by the audio encoder unit 506 from the buffer memory 502 and encoded into the audio track before the occurrence of the next ancillary data packet in the SDI video stream.

Figure 8:
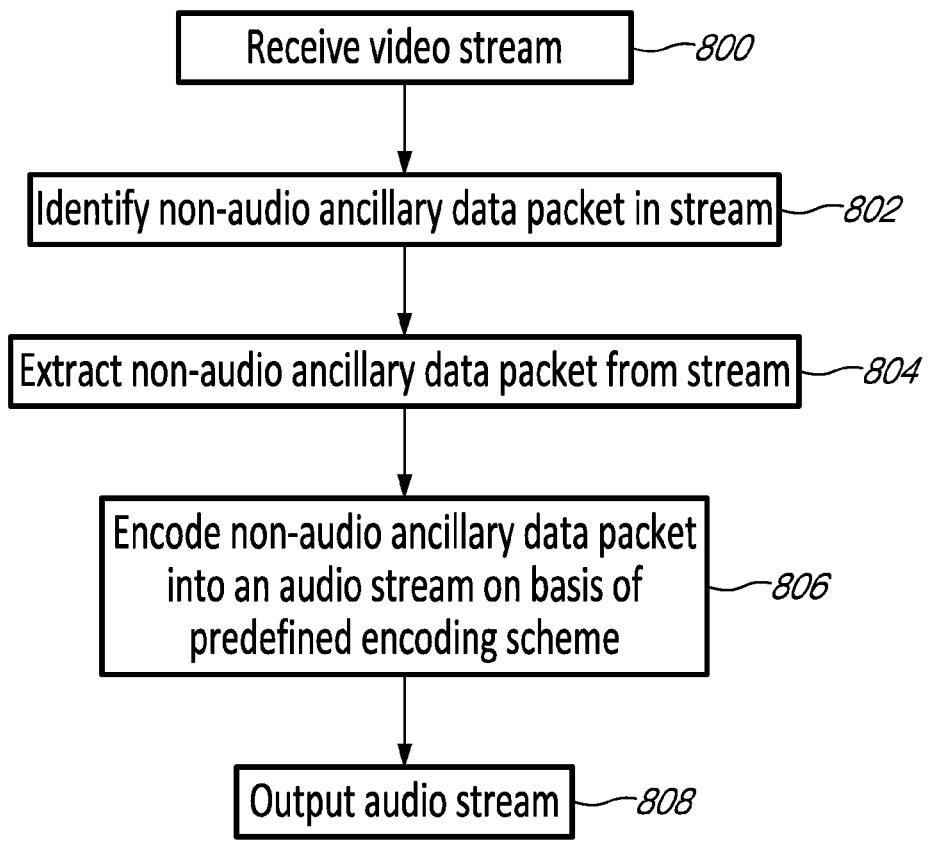
FIG. 8 is a flow diagram of a process implemented by the ancillary data capture module of FIG. 5, according to a non-limiting example of implementation of the present invention.

FIG. 8 is a flow diagram illustrating the processing implemented by the ancillary data capture module 416, according to a non-limiting example of implementation of the present invention. In this particular example, the non-audio ancillary data associated with the SDI video stream is embedded therein. At step 800, an SDI video stream is received by the ancillary data capture module 416. At step 802, a non-audio ancillary data packet is identified in the stream and, at step 804, extracted therefrom. At step 806, the extracted non-audio ancillary data packet is encoded into an audio stream on the basis of a predefined encoding scheme, such as that shown in FIG. 7. This audio stream is output from the ancillary data capture module 416 at step 808, for example for transmission to memory 302 of the I/O system 104.

In a specific, non-limiting example of implementation of the present invention, the audio stream that is output from the ancillary data capture module 416 is written to memory 302 by the audio WDMA 406A, for transfer by the I/O system 104 to a standard NLE application 102 via communication interface 106. In a further example, this audio stream contains non-audio ancillary data that will be made available alongside associated active video streams and audio streams (i.e. audio streams containing actual audio data) for editing by a video editor using the NLE application 102.

Thus, in one non-limiting example of implementation, the present invention advantageously provides for the capture of non-audio ancillary data associated with a video stream in such a way that this non-audio ancillary data can be transmitted to, preserved by and edited by a standard NLE application (e.g. one that does not support non-video, non-audio data), without any modifications to the NLE application software. By encoding the non-audio ancillary data associated with the video stream into an audio stream that is supported by the standard NLE application, the presence of the non-audio ancillary data is transparent to the NLE application, which may display the audio stream (and thus the encoded non-audio ancillary data) to a video editor alongside the active video data and the active audio data (i.e. actual audio data) of the video stream for editing purposes. The use and implementation of the present invention in the context of a standard NLE application will be discussed in further detail below.

Specific to the present invention, the capture/playback unit 300 also includes at least one ancillary data playback module connected to a video output port and adapted to receive both video streams and audio streams containing encoded non-audio ancillary data. The ancillary data playback module is operative to decode a received audio stream in order to extract therefrom the non-audio ancillary data and to transmit the video stream and its associated non-audio ancillary data to an output port of the capture/playback unit 300. The extracted non-audio ancillary data may consist of, for example, closed captioning information, metadata, etc. In a specific, non-limiting example, the ancillary data playback module is operative to embed the extracted non-audio ancillary data in the associated video stream and to transmit the reconstructed video stream to an appropriate output port. Taking for example the SDI input/output ports 108A/110A of FIG. 4, the associated audio/video hardware subsystem 410A includes an ancillary data playback module 418 for extracting non-audio ancillary data encoded into audio streams associated with SDI video streams. Note that, although not shown in FIG. 4 for the sake of clarity, other audio/video hardware subsystems of the capture/playback unit 300 may also include such an ancillary data playback module.

Note that the ancillary data playback module may be operative to process (e.g. embed into a video stream) more than one type of non-audio ancillary data simultaneously, extracted from one or more received audio streams.

FIG. 6 is a block diagram of the ancillary data playback module 418 of the audio/video hardware subsystem 410A of the capture/playback unit 300, in accordance with a non-limiting example of implementation of the present invention. In this example, the ancillary data playback module 418 includes an insertion unit 600, a buffer memory 602, at least one register 604 and an audio decoder unit 606. Note that although the functionality and implementation of the ancillary data playback module will be described herein in the context of SDI video streams with embedded non-audio ancillary data, this functionality and implementation is equally applicable in the context of other types of video streams supporting embedded non-audio ancillary data (e.g. HDMI, etc.), as well as in the context of video streams with associated but non-embedded ancillary data (e.g. non-audio ancillary data transmitted separately from the video stream).

The insertion unit 600 is connected to the buffer memory 602 and to the at least one register 604. The at least one register 604 stores one or more configuration parameters used by the insertion unit 600 to perform the insertion of the non-audio ancillary data into the associated SDI video stream, such as for example the location in the video stream frame at which to insert the respective non-audio ancillary data packet. Optionally, the at least one register 604 (or a separate set of registers) may be connected to the audio decoder unit 606 and may store one or more configuration parameters used by the audio decoder unit 606 during its decoding operations. The configuration parameters stored in register 604 (and other registers of the capture/playback unit 300) may be hardcoded or programmed during a configuration step of the I/O system 104, as will be discussed in more detail below.

The audio decoder unit 606 is also connected to the buffer memory 602 and is operative to receive an audio stream 608 containing encoded non-audio ancillary data from the audio RDMA 406D, the latter reading this audio data from memory 302 of the I/O system 104. The audio decoder unit 606 is operative to decode the received audio stream 608 on a basis of a predefined decoding scheme for extracting therefrom the non-audio ancillary data, and to store this extracted non-audio ancillary data in buffer memory 602. An example of this predefined decoding scheme will be discussed in further detail below.

The insertion unit 600 receives an SDI video stream 610 from the video RDMA 406C, which in turn reads this video data from memory 302 of the I/O system 104. This SDI video stream 610 corresponds to the audio stream 608 received by the audio decoder unit 606. The insertion unit 600 is operative to combine the non-audio ancillary data stored in the buffer memory 602 with the received video stream 610, for example by embedding this non-audio ancillary data in the video stream 610 at the appropriate location, and to output a reconstructed video stream 612. In the specific case of an SDI video stream, the non-audio ancillary data stored in the buffer memory 602 is in the form of an ancillary data packet, which the insertion unit 600 inserts into a non-active portion of a respective frame of the SDI video stream, such as the vertical or horizontal blanking portion of the frame. Obviously, in the case where the non-audio ancillary data associated with an SDI video stream is not embedded therein, but rather transmitted separately, the insertion unit 600 may be disabled or adapted to output the received non-audio ancillary data directly, without performing any insertion operations.

The audio decoder unit 606 is operative to decode the received audio stream 608, for extracting therefrom non-audio ancillary packet data, which the audio decoder unit 606 stores in buffer memory 602. The decoding scheme applied by the audio decoder unit 606 is dependent on the type of transmission interface of the received video streams, as well as on the particular audio data format of the audio streams (e.g. 24-bit linear PCM, 16-bit linear PCM, etc.) received by the audio decoder unit 606. It follows that, for each video/audio hardware subsystem 410 within the capture/playback unit 300 that handles video streams supporting embedded or associated non-audio ancillary data (e.g. SDI or HD-SDI, HDMI, etc.), the audio decoder unit of the respective ancillary data playback module may implement a different decoding scheme.

In a specific, non-limiting example of implementation of the present invention, the audio decoder unit 606 is operative to receive digital audio streams, specifically 24-bit linear (PCM) audio tracks, containing encoded SDI non-audio ancillary data packets (e.g. SDI VANC and/or HANG packets). The decoding scheme applied by the audio decoder unit 606 is basically the reverse of the encoding scheme of the audio encoder unit 506 described above. More specifically, looking at the example of FIG. 7, the decoding scheme of the audio decoder unit 606 is based on knowledge of the audio sample layout and bit patterns applied by the audio encoder unit 506 to encode the SDI ancillary data packets into the audio streams. Accordingly, the audio decoder unit 606 is operative to extract from a received SDI audio stream a plurality of words that together form an SDI ancillary data packet and to rebuild the SDI ancillary data packet according to SDI packet formatting standards, for example for insertion in the associated frame of the SDI video signal. These non-audio ancillary data packets may contain closed captioning information (SMPTE 334-1), ancillary time code information (SMPTE RP188), payload identification information (SMPTE 352), program description information (SMPTE RP-207) or camera position information (SMPTE 315), among many other possibilities.

FIG. 9 is a flow diagram illustrating the processing implemented by the ancillary data playback module 418, according to a non-limiting example of implementation of the present invention. In this particular example, the non-audio ancillary data for playback is to be embedded in its associated SDI video stream. At step 900, the ancillary data playback module 418 receives an SDI video stream, as well as an audio stream containing an encoded non-audio ancillary data packet associated with the SDI video stream. At step 902, the audio stream is decoded on the basis of a predefined decoding scheme in order to extract therefrom the non-audio ancillary data packet. At step 904, the extracted non-audio ancillary data packet is inserted into the SDI video stream at an appropriate location. The reconstructed SDI video stream with its embedded non-audio ancillary data packet is output from the ancillary data playback module 418 at step 906, for transmission to an output port 110A of the I/O system 104.

In a specific, non-limiting example of implementation of the present invention, the audio stream that is read from memory 302 by the audio RDMA 406D and transmitted to the ancillary data insertion module 418 is an audio stream that was received by the I/O system 104 from a standard NLE application 102 via communication interface 106. In a further example, this audio stream contains non-audio ancillary data that was available alongside associated active video streams and active audio streams (i.e. audio streams containing actual audio data) for editing by a video editor using the NLE application 102.

In a specific, non-limiting example of implementation of the present invention, the I/O system 104 of FIG. 1 is characterized by a normal operation mode and a configuration mode. In normal operation mode, the I/O system 104 provides for the exchange of video, audio and ancillary data between video/audio/ancillary data sources 114, output devices 116 and computer system 112, where in one example computer system 112 is running a standard NLE application 102 (such as one that has no support or limited support for non-audio ancillary data). This normal operation of the I/O system 104 includes the above-described capture/playback functionality of the present invention, whereby non-audio ancillary data associated with a video stream may be captured and encoded into an audio stream for transmission to the NLE application 102, as well as received from the NLE application 102 in the form of an audio stream and decoded therefrom for playback with its associated video stream.

In the configuration mode, the I/O system 104 can be configured by a user, in order to define the type of non-audio ancillary data (e.g. closed captioning information, Active Format Description (AFD), etc.) that is to be captured and encoded (or decoded and played back) by the capture/playback unit 300. In a specific, non-limiting example, such configuration is provided by a software-implemented user interface (or control panel) running on computer system 112, in collaboration with a software driver (also running on computer system 112) enabling communications between the user interface and the I/O system 104. For example, the user interface (or control panel) may display to the user a list of different types of non-audio ancillary data to be captured/played back by the I/O system 104, as well as for example other options regarding the configuration of the audio stream encoding the non-audio ancillary data and the formatting of the non-audio ancillary data upon playback, among other possibilities. By selecting one or more options from this list (e.g. selecting to capture/playback closed captioning data, AFD data, or both), the user is able to configure the I/O system 104 for user-specific purposes. Obviously, various different implementations and graphical layouts of such a user interface (or control panel) are possible and included in the scope of the present invention.

The software driver is operative to program or set registers of the I/O system 104 (e.g. registers 504 of the ancillary data capture module 416 and registers 604 of the ancillary data playback module 418) via the communication interface 106 with the appropriate parameters (e.g. a DID indicative of closed captioning information ("0x61" as per SMPTE 334) or AFD, a region or line at which to embed the non-audio ancillary data in the associated video stream, an enable/disable status for capture or playback, etc.) for ensuring that the desired, user-selected ancillary data is captured and/or properly played back by the I/O system 104. For example, the audio encoder unit 506 may be configured with an audio track number, indicating in which audio track of the audio WDMA 406A the encoded ancillary data should be transmitted. In another example, the audio decoder unit 606 may be configured with an audio track number, indicating in which audio track of the audio RDMA 406D the encoded ancillary data should be received. Note that, alternatively, these registers of the I/O system 104 (e.g. registers 504 and 604) may be hard-coded (or hardwired), in order to set the configuration parameters to the appropriate values for capturing and/or playing back the user-selected ancillary data.

In the specific, non-limiting example where the computer system 112 is running a standard NLE application 102, certain configuration steps may need to be taken within the NLE application 102, in order to ensure compatibility with the novel capture/playback functionality of the I/O system 104. For example, a user running the NLE software may configure some basic settings within the NLE application 102 (e.g. setting an audio resolution to 24 bits, setting an audio sample rate to 48 KHz, adjusting a playback audio quality to high, setting audio tracks to mono and disabling audio gain adjustments), in order to ensure that an audio stream containing encoded non-audio ancillary data can be successfully received, saved, displayed, edited and/or transmitted in an audio track of the NLE application 102. According to one specific, non-limiting example, settings within the NLE application 102 may be selected by a user of the NLE application 102, but the NLE application 102 is not modified in any way (e.g. the source code of the NLE application 102, which may belong to a third party, is not modified or added to in any way).

Generally, standard NLE applications guarantee audio/video synchronization. As a result, when an audio stream containing encoded non-audio ancillary data is provided into an audio track of the NLE application 102, the NLE application 102 will automatically ensure synchronization between the non-audio ancillary data packets and the frames of the associated video stream. Once configured appropriately, the NLE application 102 instructs the I/O system 104 via the software driver and over communication interface 106 to capture video and audio data. Note that, if the standard NLE application 102 is one that provides limited support of non-audio ancillary data, such as for example one that supports closed captioning information but not metadata, the NLE application 102 also instructs the I/O system 104 to capture closed captioning information.

Continuing with the non-limiting example of NLE application 102, in response to a request from the NLE application 102 via the software driver, the I/O system 104 is operative to capture active video and to transfer it to a video track of the NLE application 102, as well as to capture the associated audio data and to transfer it to a first audio track of the NLE application 102. Furthermore, the I/O system 104 is operative to capture non-audio ancillary data (that is regularly not supported by the NLE application 102 but that was specified by the user upon configuration of the I/O system 104) and to encode it into an audio stream for transfer to a second audio track of the NLE application 102. The user can then do any normal edit operations and modifications on the active video in the video track (e.g. delete frames, add frames, apply color correction, add transitions such as fade-in/fade-out, add 2D or 3D effects, chroma keying, etc.) independently of the data in the audio tracks, including the non-audio ancillary data in the second audio track. The user can thus perform the standard editing operations on the active video while preserving the regularly unsupported non-audio ancillary data in the second audio track. Note that it is also possible for the user to perform certain edit operations on the non-audio ancillary data in the second audio track (such as deleting ancillary data, copying ancillary data, etc.), prior to outputting the video and audio tracks. For example, if the user deletes a number of frames of the video stream in the video track, the user can also independently delete the corresponding non-audio ancillary data packets in the second audio track, thus ensuring proper playback of the video stream and its associated non-audio ancillary data.

As mentioned briefly above, in a variant example of implementation of the present invention, the I/O system 104 of the present invention, and specifically its novel ancillary data capture/playback functionality, is in communication via a communication interface (such as communication interface 106) with a video storage device or system, a video record/playback device (e.g. DVR or video server) or some other type of system or device that provides limited or no support of non-audio, non-video data. In the same way that the I/O system of the present invention enables the preservation of non-audio ancillary data within a standard NLE application that does not support this non-audio ancillary data, the I/O system 104 may allow for non-audio ancillary data to be stored in a video storage device or system (or processed by a video record/playback device) that does not support this non-audio ancillary data. Simply put, the encoding/decoding by the I/O system 104 of the unsupported non-audio ancillary data into/from an audio stream that is supported by the video storage device or system, the video/record playback device or other system or device renders the unsupported non-audio ancillary data generally transparent to this system or device, and thus allows for the preservation of this non-audio ancillary data.

In another variant example of implementation of the present invention, the I/O system 104 exchanges data via a communication interface 106 and an intermediate application (such as an NLE application) with a specialized software application running on a computer system 112, where this specialized software application provides for editing of ancillary data contained in an audio stream. Thus, a user of the specialized software application can modify the non-audio ancillary data contained in the audio stream. In a specific, non-limiting example, both a standard NLE application 102 and the specialized software application are running on computer station 112, where the I/O system 104 exchanges data with the NLE application 102 via communication interface 106. The user is then able to use the NLE application 102 to instruct the I/O system 104 to capture into an audio stream non-audio ancillary data (e.g. closed captioning information) associated with a video stream. Once the video stream and the corresponding audio stream containing the encoded non-audio ancillary data are available in respective video and audio tracks of the NLE application 102, the user may use the specialized application to access the audio track of the NLE application 102 for modifying the non-audio ancillary data contained in the audio stream (e.g. changing the captions of the closed captioning information contained in the audio stream). Upon completion of this editing of the contents of the audio stream by the specialized application, the edited audio stream will continue to be available in an audio track of the NLE application 102 for standard video editing operations by the NLE application 102, until the edited audio stream is transmitted back to the I/O system 104 with the corresponding video stream by the NLE application 102. Upon playback of this video stream and its associated non-audio ancillary data (as extracted from the edited audio stream) by the I/O system 104, the non-audio ancillary data will be played back as edited by the specialized application.

In yet another variant example of implementation of the present invention, the above-discussed functionality of the audio encoder unit 506 of the capture/playback unit 300 may be implemented at least in part by a dedicated software application running on a computer system 112. Thus, a user of this dedicated software application would be able to generate new, non-audio ancillary data (e.g. closed captioning information or metadata for a video stream) and to encode this non-audio ancillary data into an audio file on a basis of a predefined encoding scheme (for example the encoding scheme of FIG. 7). In one example, the audio file generated by this dedicated software application could then be loaded into an audio track of a standard NLE application 102, while the associated video stream is loaded into a video track of the NLE application 102, where the NLE application 102 may be running on the same or a remote computer system 112. Once video editing operations were completed, the NLE application 102 could then transmit the video stream and the corresponding audio stream containing the encoded non-audio ancillary data back to the I/O system 104 for playback, assuming that the predefined encoding scheme implemented by the dedicated software application matches that implemented by the audio encoder unit 506 of the I/O system 104.

The various components and modules of the I/O system 104 (see FIG. 3) and the capture/playback unit 300 (see FIG. 4) may all be implemented in software, hardware, firmware or any combination thereof, within one piece of equipment or split up among various different pieces of equipment. Specific to the audio encoder unit 506 of the ancillary data extraction module 416, as well as the audio decoder unit 606 of the ancillary data insertion module 418, this functionality may be built into one or more processing units of existing I/O systems, or more specifically of existing encoding/decoding systems within the I/O systems. Alternatively, this functionality may be provided by a dedicated processing unit designed to perform the audio encoding and decoding operations of the present invention.

Accordingly, the capture/playback functionality of the present invention, or more specifically the audio encoding and decoding of the non-audio ancillary data of video streams, may be implemented in software, hardware, firmware or any combination thereof. Obviously, various different software, hardware and/or firmware based implementations of the techniques of the present invention are possible and included within the scope of the present invention.

Although various embodiments have been illustrated, this was for the purpose of describing, but not limiting, the present invention. Various possible modifications and different configurations will become apparent to those skilled in the art and are within the scope of the present invention, which is defined more particularly by the attached claims.

What is claimed is:

1. A method for capturing ancillary data associated with a video stream, the method comprising:
   a. receiving non-audio ancillary data associated with the video stream;
   b. encoding the non-audio ancillary data into at least one audio stream as a plurality of audio samples on a basis of a predefined encoding scheme;
   c. setting certain bits of said audio samples to predetermined values such that said at least one audio stream containing the encoded non-audio ancillary data has a recognizable waveform; and
   d. outputting the at least one audio stream to a non-linear video editing application.

2. A method as defined in claim 1, wherein the non-audio ancillary data is embedded in the video stream, and wherein the step of receiving the non-audio ancillary data comprises the steps of:
   a. receiving the video stream;
   b. identifying the non-audio ancillary data embedded in the video stream; and
   c. extracting the non-audio ancillary data from the video stream.

3. A method as defined in claim 2, further comprising a step of outputting the video stream to said non-linear video editing application.

4. A method as defined in claim 2, wherein the video stream is formed of a plurality of frames, the method comprising identifying non-audio ancillary data embedded in each frame of the video stream and extracting the identified non-audio ancillary data from each respective frame.

5. A method as defined in claim 2, wherein the video stream is an uncompressed digital video stream.

6. A method as defined in claim 2, wherein the non-audio ancillary data embedded in the video stream is in the form of ancillary data packets.

7. A method as defined in claim 1, wherein said recognizable waveform indicates the position of the encoded non-audio ancillary data within said at least one audio stream.

8. A method for playing back a video stream, the method comprising:
   a. receiving a video stream from a non-linear video editing application;
   b. receiving an audio stream from the non-linear video editing application, said audio stream containing non-audio ancillary data encoded as a plurality of audio samples, said audio samples having certain bits set to predetermined values such that said audio stream containing the encoded non-audio ancillary data has a recognizable waveform, the non-audio ancillary data associated with the video stream;
   c. decoding the audio stream on a basis of a predefined decoding scheme in order to extract the non-audio ancillary data from said plurality of audio samples; and
   d. outputting the video stream and the extracted non-audio ancillary data.

9. A method as defined in claim 8, wherein the video stream is a first video stream and the step of outputting comprises the steps of:
   a. embedding the extracted non-audio ancillary data into the first video stream for generating a second video stream; and
   b. outputting the second video stream.

10. A method as defined in claim 8, wherein said recognizable waveform indicates the position of the encoded non-audio ancillary data within said audio stream.

11. An I/O system comprising:
   a. a plurality of inputs for receiving video streams, audio streams and non-audio ancillary data;
   b. an encoder unit connected to at least one of the plurality of inputs and adapted to encode non-audio ancillary data associated with a first video stream into a first audio stream as a plurality of audio samples on a basis of a predefined encoding scheme, said encoder unit operative to set certain bits of said audio samples to predetermined values such that said first audio stream containing the encoded non-audio ancillary data has a recognizable waveform;
   c. a plurality of outputs for transmitting video streams, audio streams and non-audio ancillary data;
   d. a decoder unit connected to at least one of the plurality of outputs and adapted to receive a second audio stream containing non-audio ancillary data associated with a second video stream and encoded as a plurality of audio samples, said decoder unit operative to decode the second audio stream on a basis of a predefined decoding scheme in order to extract therefrom the non-audio ancillary data associated with the second video stream; and
   e. a communication interface for data exchange between the I/O system and a non-linear editing application running on a computer system, the non-linear editing application supporting only audio and video data, wherein the I/O system is operative to transmit the first video stream and the first audio stream to the non-linear editing application for editing by a user.

12. An I/O system as defined in claim 11, wherein the I/O system includes an ancillary data capture module comprising:
   a. a first input for receiving the first video stream;
   b. an extractor unit connected to the first input and operative to identify non-audio ancillary data embedded in the first video stream and to extract the embedded non-audio ancillary data from the first video stream; and
   c. the encoder unit, wherein the encoder unit is connected to the extractor unit and receives the extracted non-audio ancillary data from the extractor unit.

13. An I/O system as defined in claim 12, wherein the I/O system includes an ancillary data playback module comprising:
   a. a second input for receiving the second video stream;
   b. a third input for receiving the second audio stream containing encoded non-audio ancillary data associated with the second video stream;
   c. the decoder unit, wherein the decoder unit is connected to the third input and receives the second audio stream therefrom; and
   d. an insertion unit connected to the second input and to the decoder unit, the insertion unit being operative to embed the non-audio ancillary data extracted from the second audio stream in the second video stream for generating a third video stream.

14. An I/O system as defined in claim 11, wherein the non-audio ancillary data associated with the first video stream is available to the user of the non-linear editing application as a plurality of audio samples of the first audio stream thereby making the non-audio ancillary data associated with the first video stream available to the user during editing.

15. An I/O system as defined in claim 11, wherein the I/O system is further operative to receive the second video stream and the second audio stream from the non-linear editing application.

16. An I/O system as defined in claim 11, wherein said recognizable waveform indicates the position of the encoded non-audio ancillary data within said first audio stream.

17. A video editing system comprising:
  a. a non-linear editing application running on a computer system, the non-linear editing application including at least one video track and at least one audio track;
  b. an I/O system including a communication interface for data exchange between the I/O system and the non-linear editing application, the I/O system operative to:
    i. capture non-audio ancillary data associated with a first video stream, encode the non-audio ancillary data into a first audio stream as a plurality of audio samples, set certain bits of said audio samples to predetermined values such that said first audio stream containing the encoded non-audio ancillary data has a recognizable waveform and provide the first audio stream containing the encoded non-audio ancillary data to an audio track of the non-linear editing application; and
    ii. receive from the audio track of the non-linear editing application a second audio stream containing non-audio ancillary data associated with a second video stream and encoded as a plurality of audio samples, decode the second audio stream to extract therefrom the non-audio ancillary data associated with the second video stream and output the extracted non-audio ancillary data.

18. A video editing system as defined in claim 17, wherein when encoding the non-audio ancillary data into said audio samples, said I/O system is operative to position the non-audio ancillary data only in bits that are higher than a predetermined group of least significant bits of said audio samples so as to reduce the effect on the non-audio ancillary data of any processing applied to said audio samples by said non-linear editing application.

19. A video editing system as defined in claim 18, wherein when encoding the non-audio ancillary data into said audio samples, said I/O system is further operative to set said group of least significant bits to a predefined value that is intermediate within a range of possible values for said group of least significant bits.

20. A video editing system as defined in claim 17, wherein said second audio stream results from preserving said first audio stream with said non-linear editing application.

21. A video editing system as defined in claim 17, wherein said second audio stream results from editing said first audio stream with said non-linear editing application.

22. A video editing system as defined in claim 17, wherein said recognizable waveform indicates the position of the encoded non-audio ancillary data within said first audio stream.

23. A video editing system comprising:
  a. a non-linear editing application running on a computer system, the non-linear editing application including at least one video track and at least one audio track;
  b. an I/O system including a communication interface for data exchange between the I/O system and the non-linear editing application, the I/O system operative to:
    i. capture non-audio ancillary data associated with a first video stream, encode the non-audio ancillary data into a first audio stream as a plurality of audio samples, position the non-audio ancillary data only in bits that are higher than a predetermined group of least significant bits of said audio samples so as to reduce the effect on the non-audio ancillary data of any processing applied to said audio samples by the non-linear editing application, and provide the first audio stream containing the encoded non-audio ancillary data to an audio track of the non-linear editing application; and
    ii. receive from the audio track of the non-linear editing application a second audio stream containing non-audio ancillary data associated with a second video stream and encoded as a plurality of audio samples, decode the second audio stream to extract therefrom the non-audio ancillary data associated with the second video stream and output the extracted non-audio ancillary data.

24. A video editing system as defined in claim 23, wherein when encoding the non-audio ancillary data into said audio samples, said I/O system is further operative to set said group of least significant bits of said audio samples to a predefined value that is intermediate within a range of possible values for said group of least significant bits.

25. A method for capturing ancillary data associated with a video stream, the method comprising:
  a. receiving non-audio ancillary data associated with the video stream;
  b. encoding the non-audio ancillary data into at least one audio stream as a plurality of audio samples on a basis of a predefined encoding scheme;
  c. positioning the non-audio ancillary data only in bits that are higher than a predetermined group of least significant bits of said audio samples so as to reduce the effect on the non-audio ancillary data of any processing applied to said audio samples; and
  d. outputting the at least one audio stream to a non-linear video editing application.

26. A method as defined in claim 25, further comprising setting said group of least significant bits of said audio samples to a predefined value that is intermediate within a range of possible values for said group of least significant bits.

27. A method for playing back a video stream, the method comprising:
  a. receiving a video stream from a non-linear video editing application;
  b. receiving an audio stream from the non-linear video editing application, said audio stream containing non-audio ancillary data encoded as a plurality of audio samples, said non-audio ancillary data being positioned only in bits that are higher than a predetermined group of least significant bits of said audio samples, the non-audio ancillary data associated with the video stream;
  c. decoding the audio stream on a basis of a predefined decoding scheme in order to extract the non-audio ancillary data from said plurality of audio samples; and
  d. outputting the video stream and the extracted non-audio ancillary data.

28. A method as defined in claim 27, wherein said group of least significant bits of said audio samples is set to a predefined value that is intermediate within a range of possible values for said group of least significant bits.

29. An I/O system comprising:
  a. a plurality of inputs for receiving video streams, audio streams and non-audio ancillary data;
  b. an encoder unit connected to at least one of the plurality of inputs and adapted to encode non-audio ancillary data associated with a first video stream into a first audio stream as a plurality of audio samples on a basis of a predefined encoding scheme, said encoder unit operative to position the non-audio ancillary data only in bits that are higher than a predetermined group of least significant bits of said audio samples so as to reduce the effect on the non-audio ancillary data of any processing applied to said audio samples;

c. a plurality of outputs for transmitting video streams, audio streams and non-audio ancillary data;

d. a decoder unit connected to at least one of the plurality of outputs and adapted to receive a second audio stream containing non-audio ancillary data associated with a second video stream and encoded as a plurality of audio samples, said decoder unit operative to decode the second audio stream on a basis of a predefined decoding scheme in order to extract therefrom the non-audio ancillary data associated with the second video stream; and e. a communication interface for data exchange between the I/O system and a non-linear editing application running on a computer system, the non-linear editing application supporting only audio and video data, wherein the I/O system is operative to transmit the first video stream and the first audio stream to the non-linear editing application for editing by a user.

30. An I/O system as defined in claim 29, wherein when encoding the non-audio ancillary data into said audio samples, said encoder unit is further operative to set said group of least significant bits to a predefined value that is intermediate within a range of possible values for said group of least significant bits.

* * * * *